(12) United States Patent
Kuchik et al.

(10) Patent No.: US 11,952,533 B2
(45) Date of Patent: Apr. 9, 2024

(54) FILTER CAKE REMOVAL COMPOSITIONS AND METHODS OF MAKING AND USING SAME

(71) Applicant: Halliburton Energy Services, Inc., Houston, TX (US)

(72) Inventors: Bhau Anantha Kuchik, Pune (IN); V. Ramireddy Devarapalli, Pune (IN); Sunita S. Kadam, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/528,610

(22) Filed: Nov. 17, 2021

(65) Prior Publication Data

US 2023/0151262 A1     May 18, 2023

(51) Int. Cl.
*C09K 8/52*     (2006.01)
*C09K 8/035*     (2006.01)

(52) U.S. Cl.
CPC ............. *C09K 8/52* (2013.01); *C09K 8/035* (2013.01)

(58) Field of Classification Search
CPC .................... C09K 8/52; C09K 8/035
See application file for complete search history.

(56) References Cited

U.S. PATENT DOCUMENTS

| | | | | |
|---|---|---|---|---|
| 6,877,563 | B2* | 4/2005 | Todd .............. | C09K 8/86 175/70 |
| 8,881,823 | B2 | 11/2014 | Collins et al. | |
| 9,982,186 | B2 | 5/2018 | Beuterbaugh et al. | |
| 2009/0286701 | A1* | 11/2009 | Davidson ............. | C09K 8/74 507/239 |
| 2012/0000652 | A1 | 1/2012 | Jones et al. | |
| 2016/0257874 | A1 | 9/2016 | Belakshe et al. | |
| 2017/0167211 | A1 | 6/2017 | Gamage et al. | |
| 2018/0252082 | A1* | 9/2018 | Zhu ................. | E21B 23/06 |
| 2019/0144736 | A1 | 5/2019 | Welton | |
| 2020/0087567 | A1 | 4/2020 | Allensworth et al. | |

FOREIGN PATENT DOCUMENTS

| | | |
|---|---|---|
| WO | 2015006579 A1 | 1/2015 |
| WO | 2016010548 A1 | 1/2016 |
| WO | 2017099896 A1 | 6/2017 |

OTHER PUBLICATIONS

Foreign Communication from Related Application—United Kingdom Combined Search and Examination Report, regarding Application No. GB2213112.2, dated Mar. 1, 2023, 5 pages.

* cited by examiner

*Primary Examiner* — Aiqun Li
(74) *Attorney, Agent, or Firm* — Conley Rose, P.C.; Rodney B. Carroll

(57) ABSTRACT

A breaker composition comprising (i) an acid precursor, (ii) an accelerating agent wherein the accelerating agent comprises a Lewis acid and (iii) an aqueous fluid wherein the effective operating temperature of the breaker composition ranges from about 15° C. to about 120° C. A wellbore servicing system comprising (a) an aqueous-based drilling fluid, wherein the aqueous-based drilling fluid forms water-wet solids in the wellbore; and (b) a breaker composition comprising (i) an acid, (ii) an accelerating agent and (iii) an aqueous fluid. A method of dissolving a filtercake comprising contacting the filtercake with a breaker solution comprising (i) an acid precursor, (ii) an accelerating agent and (iii) an aqueous fluid wherein the filtercake comprises calcium carbonate.

20 Claims, 1 Drawing Sheet

FILTER CAKE REMOVAL COMPOSITIONS AND METHODS OF MAKING AND USING SAME

FIELD

This application relates to the recovery of natural resources from a wellbore penetrating a subterranean formation, and more specifically this application relates to compositions and methods for filter cake removal.

BACKGROUND

Natural resources such as gas, oil, and water residing in a subterranean formation can be recovered by drilling wells into the formation. Well drilling involves drilling a wellbore down to the formation while circulating a drilling fluid or mud through the wellbore. Various types of drilling fluids, also known as drill-in fluids when used in the productive interval, have been used in well drilling, such as water-based fluids, mineral oil-based fluids, and synthetic oil-based fluids. Such drilling fluids form a thin, slick filter cake on the formation face that provides for successful drilling of the wellbore and that helps prevent loss of fluid to the subterranean formation.

In well drilling, several stages may be used to produce oil found in subterranean formations. The first stage, which is known as the primary production stage, allows the oil to flow into a production well (or wells) under natural forces. At first, the natural forces may be sufficient to drive the oil to the surface where it is recovered. However, at some point, pumps may be required to displace the oil from the wellbore to the surface. A secondary recovery operation thus is typically performed to recover additional amounts of the oil from the reservoir. A common secondary recovery operation known as secondary flooding involves injecting a fluid such as water into a so-called injection well (or wells) to drive oil in the formation to the production well (or wells). Tertiary recovery operations such as tertiary flooding may also be used to drive the remaining oil from the formation to the production well.

Typically, the presence of the filter cake on the face of the subterranean formation can adversely affect the flow of fluid though the injection wells and the production wells. For example, pump fracturing pressures required to inject past the filter cake are higher than desirable for achieving good sweep efficiency of the oil. Conventionally drill in fluid filter-cake cleanup is achieved by using slow releasing acids, chelating agents, oxidizers, enzyme treatments, or combinations of these materials. Ester-based products releasing in-situ acids are the materials of choice for filtercake removal as they are typically activated at elevated temperatures to release acid by hydrolysis. However, their performance at lower temperature remains a challenging area for the ester-based products. Thus, an ongoing need exists for filter-cake breaker compositions that are efficient at low temperatures.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
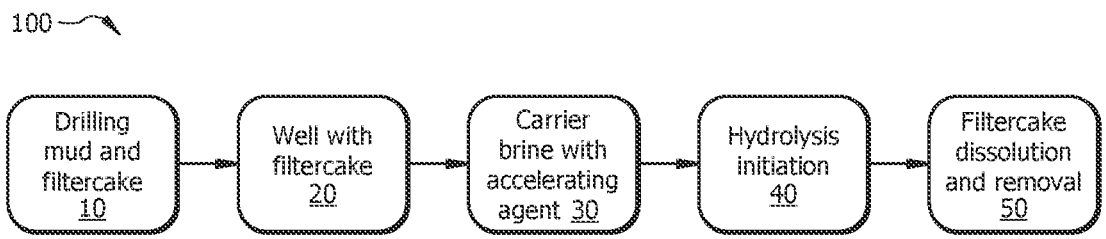
FIG. 1 is a process flow diagram of an exemplary method of the present disclosure.

Disclosed herein is a low-temperature filtercake breaking system. In some embodiments, the low-temperature filtercake breaking system comprises an acid precursor, an accelerating agent and an aqueous fluid. In some embodiments, the low-temperature filtercake breaking system expands the temperature range at which the filtercake breaking system is effective thus expanding the range of utility of the system. Hereinafter the low-temperature filtercake breaking system is designated LT-BS. In one or more embodiments, the effective operating temperature of the breaker composition ranges from about 15° C. to about 120° C.

In some embodiments, the LT-BS is used for the removal of a water-based filtercake that has been contaminated with oil wet components (e.g., crude oil). Hereinafter, the disclosure will refer to the use of the LT-BS for the removal of a water-based filtercake although the removal of other compositions of the type disclosed herein are also contemplated. The LT-BS may be placed downhole and used to service a wellbore, for example providing for removal of a filter-cake. Each of the components of the LT-BS as well as methods of using same will be described in more detail herein.

In one or more specific embodiments, the LT-BS comprises an acid precursor. Herein an acid precursor is defined as a material or combination of materials that provides for delayed release of one or more acidic species. Such acid precursors may also be referred to as time-delayed and/or time-released acids. In embodiments, acid precursors comprise a material or combination of materials that may react to generate and/or liberate an acid after a period of time has elapsed. The liberation of the acidic species from the acid precursor may be accomplished through any means known to one of ordinary skill in the art with the benefits of this disclosure and compatible with the user-desired applications.

In one or more specific embodiments, acid precursors may be formed by modifying acids via the addition of an operable functionality, component, or substituent, physical encapsulation or packaging, or combinations thereof. The operable functionality component or substituent may be acted upon in any fashion (e.g., chemically, physically, thermally, etc.) and under any conditions compatible with the components of the process in order to release the acid at a desired time and/or under desired conditions such as in situ wellbore conditions. In some embodiments, the acid precursor comprises at least one modified acid (e.g., having an operable functionality, encapsulation, packaging, etc.) such that when acted upon and/or in response to pre-defined conditions (e.g., in situ wellbore conditions such as temperature, pressure, chemical environment), an acid is released. For example, the acid precursor may comprise an acidic species that is released after exposure to an elevated temperature such as an elevated wellbore temperature. In some embodiments, the acid precursor comprises a material which reacts with one or more components of the LT-BS (e.g., reacts with an aqueous fluid present in the LT-BS) to liberate at least one acidic species.

In some specific embodiments, the acid precursor comprises a reactive ester. Hereinafter, for simplicity, the remainder of the disclosure will focus on the use of a reactive ester as the acid precursor with the understanding that other acid precursors may be used in various embodiments. The reactive ester may be converted to an acidic species by hydrolysis of the ester linkage, for example by contact with water present in the aqueous fluid of the LT-BS and/or water present in situ in the wellbore.

Suitable acid precursors for use in the present disclosure include, without limitation, lactic acid derivatives such as methyl lactate, ethyl lactate, propyl lactate, butyl lactate; esters and/or formates that are water soluble or partially soluble such as ethylene glycol monoformate, ethylene glycol diformate, diethylene glycol diformate, glyceryl monoformate, glyceryl diformate, glyceryl triformate, triethylene glycol diformate; formate esters of pentaerythritol; esters or polyesters of glycerol including, but not limited to, tripropionin (a triester of propionic acid and glycerol), trilactin, esters of acetic acid and glycerol such as monoacetin, diacetin, and triacetin; esters of glycolic acid such as ethyl or methyl or propyl or butyl glycolate or esters of glycolic acid and polyols such as glycerol and glycols, aliphatic polyesters; poly(lactides); poly(glycolides); poly(ε-caprolactones); poly(hydroxybutyrates); poly(anhydrides); aliphatic polycarbonates; poly(amino acids), and polyphosphazenes; or copolymers thereof: poly(ortho esters); orthoesters (which may also be known as "poly ortho ethers" or "ortho ethers"); esters of oxalic acid; aliphatic polyesters; poly(lactides); poly(glycolides); poly(ε-caprolactones); poly(hydroxybutyrates); poly(anhydrides); poly(amino acids); esters of propionic acid; esters of butyric acid; esters of monochloroacetic acid; esters of dichloroacetic acid; esters of trichloroacetic acid; derivatives thereof; or a combination thereof other suitable acid precursors include, without limitation, halide esters and esters of acids such as esters of nitric acid, sulphuric acid, sulphonic acid, sulphinic acid, phosphoric acid, phosphorous acid, phosphonic acid, phosphinic acid, sulphamic acid and the like.

In some embodiments, the acid precursor comprises diethylene glycol diformate, diethylene glycol monoformate, monoethylene monoformate, monoethylene diformate, ethyl lactate, methyl lactate, tri-n-propyl orthoformate, tri-n-butyl orthoformate, or a combination thereof.

The choice and physical form of a suitable acid precursor may depend on a variety of factors including but not limited to the time at which liberation of the acidic species is desired relative to the placement of the LT-BS in the wellbore; the environmental conditions presented; the conditions within the wellbore; the temperature of the wellbore section in which the LT-BS is being placed; the composition of the formation water, etc.

The acid precursor may be present the LT-BS in an amount ranging from about 5 volume/volume % (vol/vol %) to about 50 vol/vol % based on the total volume of the composition, alternatively from about 5 vol/vol % to about 30 vol/vol %, alternatively from about 10 vol/vol % to about 25 vol/vol %, alternatively from about 12 vol/vol % to about 18 vol/vol %.

Aqueous fluids that may be used in the LT-BS include any aqueous fluid suitable for use in subterranean applications. For example, the LT-BS may comprise water or a brine. Suitable brines include, but are not limited to: KCl, NaCl, NaBr, $CaCl_2$, $CaBr_2$, $ZnBr_2$, sodium formate, potassium formate, cesium formate, combinations thereof and derivatives thereof. The specific brine used may be dictated by the desired density of the wellbore servicing fluid. Denser brines may be useful in some instances. The density of the aqueous fluid, and likewise the density of the LT-BS, may be selected and adjusted to meet some user and/or process goal. In some embodiments, the aqueous fluid comprises a brine, alternatively NaBr. The brine may be present in an amount of from about 40 vol/vol % to about 95 vol/vol % based on the total weight of the composition, alternatively from about 60 vol/vol % to about 95 vol/vol %, alternatively from about 75 vol/vol % to about vol/vol %. Alternatively, the aqueous fluid may comprise the balance of the LT-BS after considering the amount of the other components used.

In one or more specific embodiments, the LT-BS comprises an accelerating agent. In such embodiments, the accelerating agent functions to increase the rate of hydrolysis of the ester present in the LT-BS at lower temperatures. For example, an LT-BS may increase the rate of hydrolysis by from about 1.5 times to about 30 times when compared to the reaction rate in the absence of an accelerating agent, alternatively from about 1.5 times to about 20 times or alternatively from about 1.5 times to about 10 times at temperatures of from about 15° C. to about 120° C., alternatively from about 20° C. to about 120° C., or alternatively from about 20° C. to about 110° C.

In one or more specific embodiments, the accelerating agent comprises a Lewis acid. Herein a Lewis acid takes it standard definition as a compound or ionic species which can accept an electron pair from a donor compound. In some embodiments, the Lewis acid comprises an inorganic salt that generates an acid in the presence of an aqueous fluid such as a brine. Nonlimiting examples of Lewis acids that may be suitable for use in the present disclosure includes $H^+$, $K^+$, $Mg^{2+}$, $Fe^{3+}$, $BF_3$, $CO_2$, $SO_3$, $AlCl_3$, $Br_2$, $SO_4^{2-}$, $ZnSO_4$, $ZnC_2H_3O_2$, $ZnCO_3$, $ZnCl_2$, Ni (II) salts, Cu (II) salts, LiOH, NaOH, $(C_4H_9)_4NOH$, $KAl(SO_4)_2.12H_2O$, NaI, $AlCl_3$, $TiCl_4$, derivatives thereof, hydrates thereof or a combination thereof. In embodiments, the accelerating agent comprises $ZnSO_4$, alternatively a hydrated $ZnSO_4$. An accelerating agent may be included in the LT-BS in an amount of from about 1 weight/volume percent (wt./vol. %) to about 30 wt./vol. %, alternatively from about 1 wt./vol. % to about 25 wt./vol. % or alternatively from about 1 wt./vol. % to about 15 wt./vol. %.

In one or more specific embodiments, a LT-BS comprises an acid precursor, an aqueous fluid and an accelerating agent. For example, the LT-BS may comprise a formate ester. Hydrolysis of a formate ester is known to be rapid in comparison to the hydrolysis of acetates or propionates under similar hydrolysis conditions. Consequently, the formate when hydrolyzed produces formic acid which in turn lowers the pH of the LT-BS and increases the hydrolysis of additional formate ester.

The components of the LT-BS (e.g., acid precursor, aqueous fluid, accelerating agent) may be combined using any mixing device compatible with the composition. In some embodiments, the components of the LT-BS are combined at the well site; alternatively, the components of the LT-BS are combined off-site and are transported to and used at the well site. The contacting of the components of the LT-BS may initiate hydrolysis of the acid precursor by the aqueous fluid, for example via hydrolysis and dissociation of ester groups present in the precursors. Release of one or more acidic species from the acid precursor will decrease the pH of the LT-BS and the accelerating agent will increase hydrolysis of the acid precursors present, at temperatures ranging from about 15° C. to about 120° C.

A schematic depiction of a method of the present disclosure 100 is presented in FIG. 1. With reference to FIG. 1, in general a drilling mud is introduced to a wellbore with components sufficient to form a filtercake 10 resulting a well having a filter cake 20. The method further comprises the introduction of a LT-BS 30 and initiation of the hydrolysis of the LT-BS esters 40. In some embodiments, the filtercake is dissolved by the LT-BS 50.

In some embodiments, a method of servicing a wellbore comprises drilling a wellbore in a subterranean formation and introducing to the formation an aqueous-based servicing and/or drilling fluid or an aqueous-based servicing and/or drilling fluid that wherein water-wet solids (e.g., filtercake, drill cuttings, etc.) are formed as a result. It is to be understood that "subterranean formation" encompasses both areas below exposed earth and areas below earth covered by water such as ocean or fresh water.

In one or more specific embodiments, the introduction of an aqueous-based fluid (e.g., drilling fluid) may result in the deposition of water-wet solids on the sides or surfaces within the wellbore. The water-wet solids may be components of the filter cake, a formation face, a fracture face, a perforation, or on a screen (e.g., a gravel pack screen) or another piece of equipment located in the wellbore or subterranean formation.

The method further comprises contact of the water-wet solids with a LT-BS as described herein to effect removal of the water-soluble components from the water-wet solids and/or conversion of the solids from oil-wet to water-wet. For example, a LT-BS may be placed in a wellbore and contacted with a filtercake or other water-wet solids located down hole. The water-wet solids when contacted with a LT-BS of the type disclosed herein may be degraded by the LT-BS. For example, the LT-BS may contact and decompose one or more components of the water-wet solids (e.g., calcium-based components such as calcium carbonate contained in the filtercake). The LT-BS disclosed herein may result in the removal of water-wet solids (e.g. filtercake) at low temperatures (e.g., 25° C.) while minimizing damage to the formation or to allow for other servicing operations. Following treatment with a LT-BS, production can then take place, if desired or appropriate, as for example in a hydrocarbon-producing well.

EXAMPLES

The presently disclosed subject matter having been generally described, the following examples are given as particular embodiments of the subject matter and to demonstrate the practice and advantages thereof. It is understood that the examples are given by way of illustration and are not intended to limit the specification or the claims in any manner.

Example 1

The effect of the amount of an accelerating agent on filtercake breakthrough times was investigated. Specifically, $ZnSO_4$, in the amounts indicated in Table 1, was added to a breaker solution including a brine and an acid precursor. The filter cake breakthrough times that were observed for various percentages of $ZnSO_4$ are presented in Table 1.

TABLE 1

| $ZnSO_4$ conc. (% wt/vol) | 0% | 5% | 7.5% | 10% |
|---|---|---|---|---|
| Breakthrough time | 44 hrs | 42 hrs | 21 hrs | 5 hrs |

The effect of an accelerating agent of the type disclosed herein on the pH of the breaker solution was investigated. Specifically, three samples were prepared. The first sample contained a NaBr brine; the second sample contained a NaBr brine with a density of 10 ppg and an acid precursor having 15 vol/vol % and a third sample having the LT-BS with 5 wt. % $ZnSO_4$. The initial pH values for the samples and the pH values given in Table 2.

TABLE 2

| Sample | pH value |
|---|---|
| Only 10 ppg NaBr brine | 6.2 |
| 10 ppg NaBr Brine + Acid precursor | 2.92 |
| 10 ppg NaBr Brine + LT-BS (Acid precursor + $ZnSO_4$) | 2.90 |

The pH values of the breaker solutions with and without addition of $ZnSO_4$ did not result in a significant change in the pH. Consequently, the enhancement in hydrolysis is not attributable to the acidic nature created by the $ZnSO_4$ in the solution.

Example 2

The rate of hydrolysis of the acid precursor in an LT-BS of the type disclosed herein was investigated. Specifically, three samples were prepared, Sample 1 contained an acid precursor and a 11 ppg NaBr brine; Sample 2 contained an acid precursor, an 11 ppg NaBr and 0.33% (w/v) $ZnSO_4.7H_2O$; while Sample 3 contained an acid precursor, an 11 ppg NaBr and 1.66% (w/v)$ZnSO_4.7H_2O$. The rate of hydrolysis of the ester (acid precursor) at 90° C. was monitored and the results are presented in Table 3.

TABLE 3

| Sample Number | Rate (mol/sec) |
|---|---|
| Sample 1 | 2.40E−06 |
| Sample 2 | 2.97E−06 |
| Sample 3 | 5.76E−06 |

Figure 2:
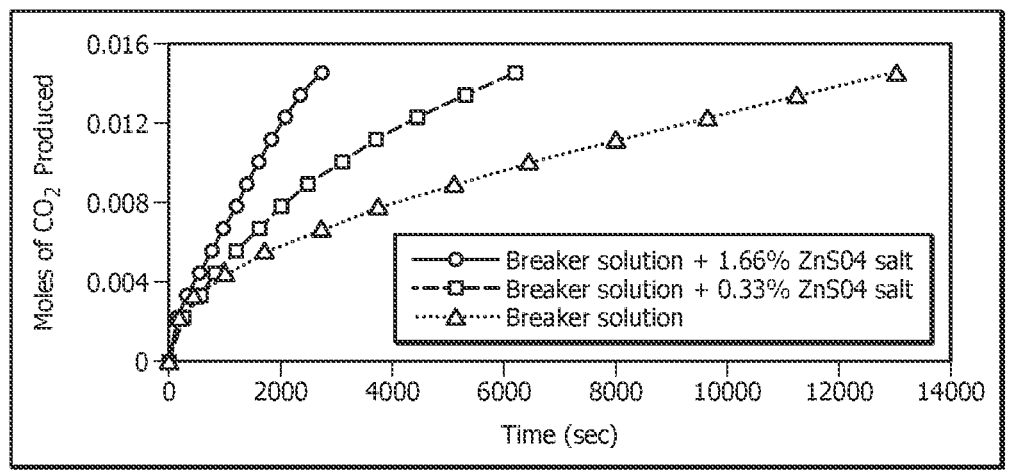
FIG. 2 is a plot of the moles of carbon dioxide produced as a function of time for the hydrolysis reactions carried out using compositions of the present disclosure.

The hydrolysis study was carried out by addition of breaker solution to calcium carbonate. The rate of hydrolysis of the LT-BS was observed to increase with increasing amounts of the accelerating agent. As another metric of the rate of hydrolysis, the rates of $CO_2$ produced as a function of time was determined for each of the samples. These results are presented in FIG. 2. The results indicate that increasing amounts of accelerating agent increased the rates of $CO_2$ produced.

Example 3

The ability of an LT-BS of the type disclosed herein to breakthrough a filtercake was investigated at 90° C. Specifically, samples were prepared containing a acid precursor, and 11 ppg NaBr. The samples contained 20% acid precursor and 0, 5%, 7.5% or 10% w/v $ZnSO_4·7H_2O$ in 11 ppg NaBr brine. The results are summarized in Table 4.

TABLE 4

| $ZnSO_4·7H_2O$ (w/v) | 0% | 5% | 7.5% | 10% |
|---|---|---|---|---|
| Final pH (after soak test) | 2.2 | 2.32 | 2.44 | 2.40 |
| Break Time | 44 hrs | 42 hrs | 21 hrs | 5 hrs |
| Filter cake disc after soak test (24 hrs after break) | | | Filter cake broken | Filter cake broken |

Example 4

The ability of an LT-BS of the type disclosed herein to breakthrough a filtercake was investigated at 80° C. Specifically, two samples were prepared using a KCl brine density of 9.5 ppg, The components and break time for each sample are described in Table 5.

TABLE 5

| | | |
|---|---|---|
| $ZnSO_4 \cdot 7H_2O$ (%w/v) | 0 | 7.5 |
| Acid precursor (% w/v) | 20 | 20 |
| Final pH (after soak test) | 2.89 | 2.72 |
| Break Time | 70 hrs | 23 hrs |

The results indicate that the presence of the accelerating agent decreased the break time of the filter cake.

Additional Disclosure

The following are non-limiting, specific embodiments in accordance and with the present disclosure:

A first embodiment which is a breaker composition comprising (i) an acid precursor, (ii) an accelerating agent wherein the accelerating agent comprises a Lewis acid and (iii) an aqueous fluid wherein the effective operating temperature of the breaker composition ranges from about 15° C. to about 120° C.

A second embodiment which is the breaker composition of the first embodiment wherein the Lewis acid comprises $H^+$, $K^+$, $Mg^{2+}$, $Fe^{3+}$, $BF_3$, $CO_2$, $SO_3$, $AlCl_3$, $Br_2$, $SO_4^{2-}$, $ZnSO_4$, $ZnC_2H_3O_2$, $ZnCO_3$, $ZnCl_2$, Ni (II) salts, Cu (II) salts, LiOH, NaOH, $(C_4H_9)_4NOH$, $KAl(SO_4)_2 \cdot 12H_2O$, NaI, $AlCl_3$, $TiCl_4$, derivatives thereof, hydrates thereof or a combination thereof.

A third embodiment which is the breaker composition of any of the first through second embodiments wherein the accelerating agent comprises $ZnSO_4$.

A fourth embodiment which is the breaker composition of any of the first through third embodiments wherein the accelerating agent is present in an amount of from about 1 wt/vol % to about 30 wt./vol %.

A fifth embodiment which is the breaker composition of any of the first through fourth embodiments wherein the acid precursor comprises lactic acid derivatives; esters and/or formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof.

A sixth embodiment which is the breaker composition of any of the first through fifth embodiments wherein the acid precursor comprises a reactive ester.

A seventh embodiment which is the breaker composition of any of the first through sixth embodiments wherein the acid precursor is present in an amount of from about 5 vol/vol % to about 50 vol/vol % based on the total volume of the composition.

An eighth embodiment which is the breaker composition of any of the first through seventh embodiments wherein the aqueous fluid comprises a brine.

A ninth embodiment which is the breaker composition of the eighth embodiment wherein the brine comprises KCl, NaCl, NaBr, $CaCl_2$, $CaBr_2$, $ZnBr_2$, sodium formate, potassium formate, cesium formate, or a combination thereof.

A tenth embodiment which is the breaker composition of any of the first through ninth embodiments wherein the aqueous fluid is present in an amount of from about 40 wt. % to about 95 wt. % based on the total weight of the composition.

An eleventh embodiment which is a wellbore servicing system comprising: (a) an aqueous-based drilling fluid, wherein the aqueous-based drilling fluid forms water-wet solids in the wellbore: and (b) a breaker composition comprising (i) an acid precursor, (ii) an accelerating agent comprising a Lewis acid and (iii) an aqueous fluid.

A twelfth embodiment which is the wellbore servicing system of the eleventh embodiment wherein the acid precursor comprises a reactive ester.

A thirteenth embodiment which is the wellbore servicing system of any of the eleventh through twelfth embodiments wherein the water-wet solids form a filtercake.

A fourteenth embodiment which is the wellbore servicing system of any of the eleventh through thirteenth embodiments wherein the accelerating agent comprises $H^+$, $K^+$, $Mg^{2+}$, $Fe^{3+}$, $BF_3$, $CO_2$, $SO_3$, $AlCl_3$, $Br_2$, $SO_4$, $ZnSO_4$, $ZnC_2H_3O_2$, $ZnCO_3$, $ZnCl_2$, Ni (II) salts, Cu (II) salts, LiOH, NaOH, $(C_4H_9)_4NOH$, $KAl(SO_4)_2 \cdot 12H_2O$, NaI, $AlCl_3$, $TiCl_4$, derivatives thereof, hydrates thereof or a combination thereof.

A fifteenth embodiment which is the wellbore servicing system of any of the eleventh through fourteenth embodiments wherein the accelerating agent comprises $ZnSO_4$.

A sixteenth embodiment which is a method of dissolving a filtercake comprising contacting the filtercake with a breaker solution comprising (i) an acid precursor, (ii) an accelerating agent wherein the accelerating agent comprises a Lewis acid and (iii) an aqueous fluid wherein the filtercake comprises calcium carbonate.

A seventeenth embodiment which is the method of the sixteenth embodiment wherein contacting occurs at a temperature ranging from about 15° C. to about 120° C.

An eighteenth embodiment which is the method of any of the sixteenth through seventeenth embodiments wherein the acid precursor comprises a reactive ester.

A nineteenth embodiment which is the method of any of the sixteenth through eighteenth embodiments wherein the accelerating agent comprises $H^+$, $K^+$, $Mg^{2+}$, $Fe^{3+}$, $BF_3$, $CO_2$, $SO_3$, $AlCl_3$, $Br_2$, $SO_4^{2-}$, $ZnSO_4$, $ZnC_2H_3O_2$, $ZnCO_3$, $ZnCl_2$, Ni (II) salts, Cu (II) salts, LiOH, NaOH, $(C_4H_9)_4NOH$, $KAl(SO_4)_2 \cdot 12H_2O$, NaI, $AlCl_3$, $TiCl_4$, derivatives thereof, hydrates thereof or a combination thereof.

A twentieth embodiment which is the method of any of the sixteenth through nineteenth embodiments wherein the aqueous fluid comprises a brine.

A twenty-first embodiment which is a method of servicing a wellbore comprising: circulating an aqueous-based wellbore servicing fluid into the wellbore wherein the aqueous based wellbore servicing fluid forms a water-wet filtercake; placing in the wellbore a filtercake breaker solution comprising (a) an acid precursor comprising a reactive ester; (b) an accelerating agent comprising a Lewis acid and (c) a brine wherein the filtercake breaker solution has an effective operating temperature ranging from about 15° C. to about 120° C.

A twenty-second embodiment which is a method of servicing a wellbore comprising: forming a water-wet filtercake on one or more surfaces of a wellbore wherein the wellbore temperature ranges from about 15° C. to about 120° C.;

contacting the water-wet filtercake with a filtercake breaker solution comprising a reactive ester, $ZnSO_4$ and a brine.

The subject matter having been shown and described, modifications thereof can be made by one skilled in the art without departing from the spirit and teachings of the subject matter. The embodiments described herein are exemplary only and are not intended to be limiting. Many variations and modifications of the subject matter disclosed herein are possible and are within the scope of the disclosed subject matter. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as some embodiments of the present disclosure. Thus, the claims are a further description and are an addition to the embodiments of the present invention. The discussion of a reference herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

We claim:

1. A method of dissolving a filtercake within a wellbore comprising:
   introducing to a wellbore a breaker solution comprising (i) an acid precursor, (ii) an accelerating agent wherein the accelerating agent comprises $ZnSO_4$, or a hydrates thereof, and (iii) an aqueous fluid; and
   contacting the filtercake with the breaker solution,
   wherein contacting occurs in the wellbore at a temperature ranging from about 15° C. to about 120° C.; wherein the filtercake comprises calcium carbonate and wherein a rate of acid precursor hydrolysis is increased by from about 5 times to about 30 times the rate of acid precursor hydrolysis observed in the absence of an accelerating agent.

2. The method of claim 1 wherein the acid precursor comprises a reactive ester.

3. The method of claim 1 wherein the aqueous fluid comprises a brine.

4. The method of claim 1 wherein the accelerating agent is present in an amount of from about 1 wt./vol % to about 30 wt./vol %.

5. The method of claim 4 wherein the aqueous fluid comprises KCl, NaCl, NaBr, $CaCl_2$, $CaBr_2$, $ZnBr_2$, sodium formate, potassium formate, cesium formate, or a combination thereof.

6. The method of claim 1 wherein the acid precursor comprises lactic acid derivatives; esters and/or formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof.

7. The method of claim 6 wherein the aqueous fluid comprises KCl, NaCl, NaBr, $CaCl_2$, $CaBr_2$, $ZnBr_2$, sodium formate, potassium formate, cesium formate, or a combination thereof.

8. The method of claim 1 wherein the acid precursor is present in an amount of from about 5 vol/vol % to about 50 vol/vol % based on the total volume of the composition.

9. The method of claim 8 wherein the aqueous fluid is present in an amount of from about 40 wt. % to about 95 wt. % based on the total weight of the composition.

10. The method of claim 1 wherein the accelerating agent changes a pH of the breaker by equal to or less than about 10% when compared to the pH change observed with the acid precursor and brine alone.

11. The method of claim 1 wherein the contacting occurs at a temperature of from about 15° C. to about 90° C.

12. The method of claim 1 wherein the contacting occurs at a temperature of from about 15° C. to about 90° C. and wherein the accelerating agent changes a pH of the breaker by equal to or less than about 10% when compared to the pH change observed with the acid precursor and brine alone.

13. A method of breaking a filtercake disposed on a wall of a wellbore penetrating a subterranean formation, comprising:
   contacting the filtercake with a breaker comprising (a) an acid precursor; (b) a brine; and (c) an accelerating agent at a downhole temperature of from 15° C. to about 100° C. wherein the accelerating agent is selected from the group consisting of $ZnSO_4$ and hydrates thereof; wherein addition of the accelerating agent changes a pH of the breaker by equal to or less than about 10% when compared to the pH change observed with the acid precursor and brine alone and wherein a rate of acid precursor hydrolysis is increased by from about 5 times to about 30 times the rate of acid precursor hydrolysis observed in the absence of an accelerating agent.

14. The method of claim 13 wherein the filtercake comprises calcium carbonate.

15. The method of claim 13 wherein the brine comprises KCl, NaCl, NaBr, $CaCl_2$, $CaBr_2$, $ZnBr_2$, sodium formate, potassium formate, cesium formate, or a combination thereof.

16. The method of claim 13 wherein the acid precursor comprises lactic acid derivatives; esters and/or formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof.

17. The method of claim 13 wherein the contacting occurs at a temperature of from about 15° C. to about 90° C.

18. The method of claim 13 wherein the accelerating agent is present in an amount of from about 1 wt./vol % to about 30 wt./vol % and the aqueous fluid is present in an amount of from about 40 wt. % to about 95 wt. % based on the total weight of the composition.

19. The method of claim 18, wherein the brine comprises KCl, NaCl, NaBr, $CaCl_2$, $CaBr_2$, $ZnBr_2$, sodium formate, potassium formate, cesium formate, or a combination thereof and
wherein the acid precursor comprises lactic acid derivatives; esters and/or formates that are water soluble or partially water soluble; esters or polyesters of glycerol; esters of acetic acid and glycerol; aliphatic polyesters; poly(lactides); poly(glycolides); poly(ε-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof.

20. The method of claim 13 wherein the filtercake comprises calcium carbonate; wherein the brine comprises KCl, NaCl, NaBr, $CaCl_2$, $CaBr_2$, $ZnBr_2$, sodium formate, potassium formate, cesium formate, or a combination thereof; wherein the acid precursor comprises lactic acid derivatives; esters and/or formates that are water soluble or partially water soluble; esters or polyesters of glycerol; esters of acetic acid and glycerol; aliphatic polyesters; poly(lactides); poly(glycolides); poly(e-caprolactones); poly(hydroxybutyrates); poly(anhydrides); aliphatic polycarbonates; polyphosphazenes; poly(ortho esters); orthoesters; esters of oxalic acid; poly(amino acids); esters of propionic acid; esters of butyric acid; halide esters; esters of nitric acid, sulphuric acid, sulphonic acid, sulphinic acid, phosphoric acid, phosphorous acid, phosphoric acid, phosphonic acid, phosphinic acid, sulphamic acid; derivatives thereof or a combination thereof; wherein the contacting occurs at a temperature of from about 15° C. to about 90° C.

* * * * *